United States Patent
Fukushima et al.

(10) Patent No.: US 6,292,489 B1
(45) Date of Patent: Sep. 18, 2001

(54) ROUTER DEVICE AND NETWORK SYSTEM USING THE SAME

(75) Inventors: Hidehiro Fukushima, Fujisawa; Kenji Kawakita, Urawa; Naoya Ikeda, Ebina; Masashi Kamegaya, Zama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/478,537

(22) Filed: Jan. 6, 2000

Related U.S. Application Data

(63) Continuation of application No. 08/870,398, filed on Jun. 6, 1997, now Pat. No. 6,034,964.

(30) Foreign Application Priority Data

Jun. 11, 1996 (JP) .................................................. 8-149016

(51) Int. Cl.[7] .................................................. H04L 12/28
(52) U.S. Cl. .......................... 370/401; 370/392; 709/238
(58) Field of Search ..................................... 370/351, 352, 370/356, 357, 360, 386, 389, 392, 400, 401; 709/218, 219, 229, 238, 239, 240, 241, 242, 243, 244

(56) References Cited

U.S. PATENT DOCUMENTS

| | | |
|---|---|---|
| 5,519,705 * | 5/1996 | Fukutomi ............................ 370/402 |
| 5,530,963 | 6/1996 | Moore et al. . |
| 5,583,862 | 12/1996 | Callon . |
| 5,633,866 | 5/1997 | Callon . |
| 5,699,347 | 12/1997 | Callon . |
| 5,802,316 | 9/1998 | Ito et al. . |
| 5,822,319 | 10/1998 | Nagami et al. . |

OTHER PUBLICATIONS

Nikkei Communications, New Type Protocol Appears, Which Manages TCP/IP Band Width in Multimedia Use, Y. Kawai, Nov. 6, 1995.

IEEE Network, RSVP: A New Resource Reservation Protocol, L. Zhang, et al, Sep. 1993.

* cited by examiner

*Primary Examiner*—Ajit Patel
*Assistant Examiner*—Bob A. Phunkulh
(74) *Attorney, Agent, or Firm*—Antonelli, Terry, Stout & Kraus, LLP

(57) ABSTRACT

A router device facilitates management of connection of a manager and assures communication quality of each of the connections. The router device determines a communication quality required by the communication of the packet in reference to a protocol information, an application acknowledging information and a priority information, transmits the control packet having the determined communication quality set therein to another router device contained in the same connection and further performs a traffic control (a preferential processing of a packet or the like) satisfying a communication quality indicated by the transmitted or received control packet in respect to the packet of the aforesaid connection.

8 Claims, 14 Drawing Sheets

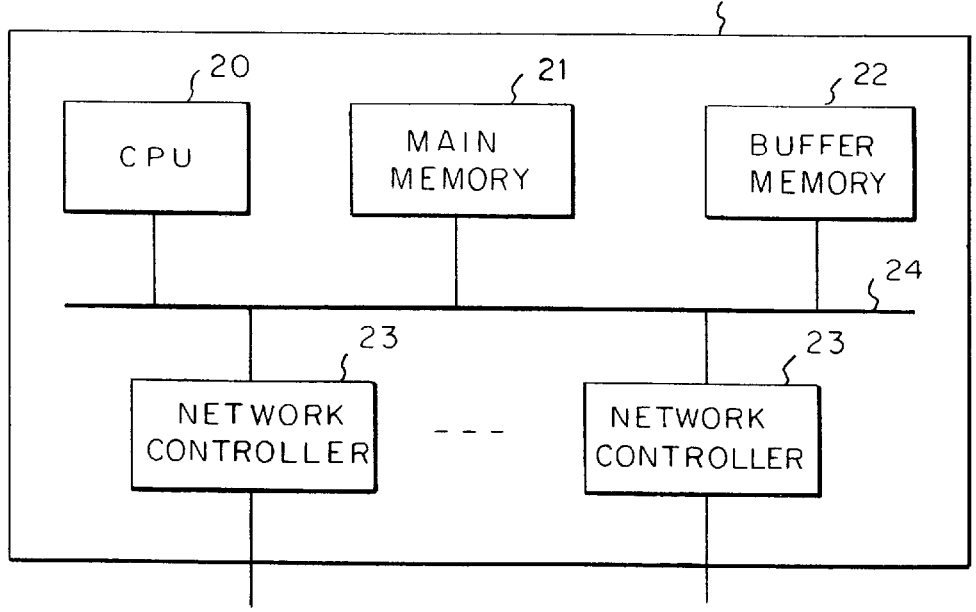
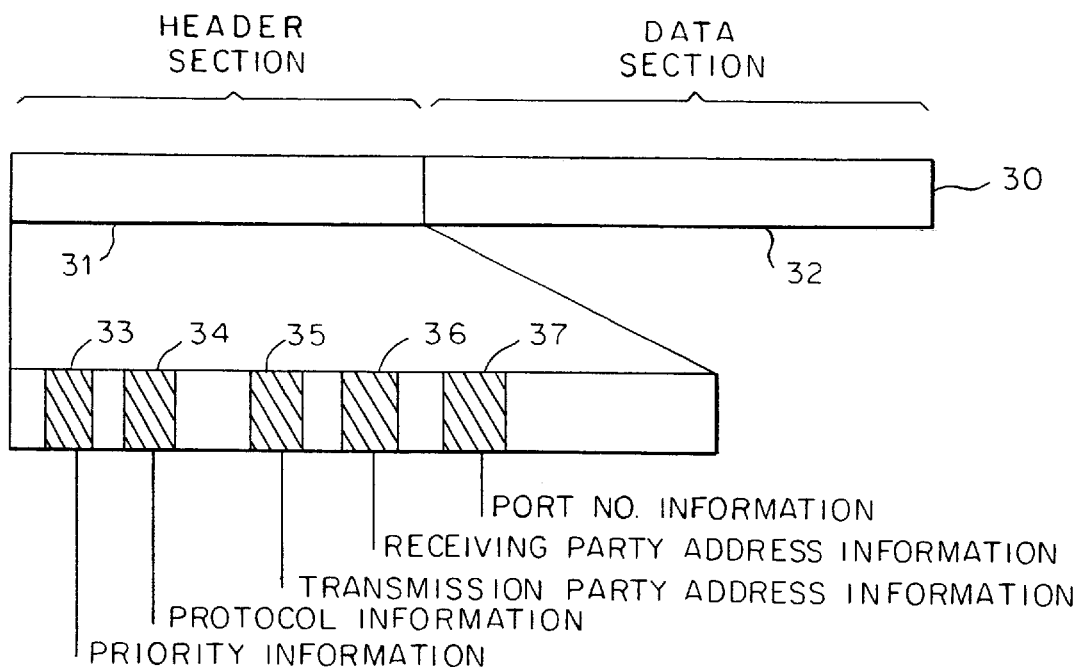

FIG. 4

| NO | RECEIVING PARTY ADDRESS | PROTOCOL | PORT NO. | POINTER INFORMATION |
|---|---|---|---|---|
| 1 | b | A | w | 1 |
| 2 | c | B | x | 2 |
| | | | | |
| | | | | |

→ TO MAPPING TABLE

FIG. 5a

| TRANSMISSION PARTY ADDRESS | RECEIVING PARTY ADDRESS | PERMIT FLAG | POINTER INFORMATION |
|---|---|---|---|
| a | b | ON | 1 |
| a | c | ON | 2 |
| a | d | ON | 3, 4 |
| a | e | OFF | — |

→ TO MAPPING TABLE

FIG. 5b

| IDENTIFIER | PROTOCOL PORT NO. | PRIORITY INFORMATION ||||||||
|---|---|---|---|---|---|---|---|---|---|
| | | 0 | 1 | 2 | 3 | 4 | 5 | 6 | 7 |
| 1 | <A,w> | 0D | 0D | 0D | 0D | 1D | 1D | 1D | 1D |
| 2 | <B,x> | 3N | 3N | 3N | 3N | 3N | 3N | 3N | 3N |
| 3 | <C,y> | 2D | 2D | 3D | 3D | 3N | 3N | 3N | 3N |
| 4 | <C,z> | 2D | 2D | 3D | 3D | 3D | 3D | 3D | 3D |

0: PRIORITY CLASS LOW
3: PRIORITY CLASS HIGH
D: DISCARDED CLASS DROP
N: DISCARDED CLASS NON-DROP

ROUTER DEVICE AND NETWORK SYSTEM USING THE SAME

This is a continuation of application Ser. No. 08/870,398, filed Jun. 6, 1997 now U.S. Pat. No. 6,034,964.

BACKGROUND OF THE INVENTION

This invention relates to a router device for use in forwarding a communication between networks.

A router device connects a plurality of networks and further performs to forwarding a packet sent between the connected networks. In addition, the router device performs a traffic control for processing preferentially a specified packet in order to assure a communication quality of connection between the terminals to be communicated.

There is a certain system in which this traffic control is carried out in accordance with the management information registered in a router device by a managing person for the network. In this system, for example, as to the terminal device for performing a communication requiring a real-time characteristic, managing information for instructing a preferential processing for a packet required by the terminal device is registered in advance in the router device. However, the managing person must register managing information having the same contents in respect to all the router devices where the packet of the connection may pass in the case that a certain connection is to be registered.

In turn, it has been promoted to make a standardization for a protocol (a resource reservation protocol) capable of specifying a traffic control (assignment for a communication band) from a terminal device of a user in a network to a router device. In the system to which this protocol is applied, all the terminals in the system are provided with a program capable of performing a communication of the protocol. When a communication is started, the transmission terminal specifies a communication band width by the communication of the resource reservation protocol to a terminal of a communicating party and routers forwarding the communication. The router device may perform a traffic control in such a way that it may fulfill the specified communication band width or the like. A detailed information about the aforesaid protocol is described in "RSVP: A New Resource Reservation Protocol" L. Zhang, S. Deering, D. Estrin, S. Shenker & D. Zappala, IEEE Network 1993.9.

In the system in which a managing person registers a managing information indicating the content of the traffic control, it is necessary to perform a registration of the same content in respect to all the router devices through which a packet may pass for every connection. In the case that there are many router devices performing a forwarding, this registration may become a substantial burden for a managing person.

Adopting the reservation protocol eliminates the need for setting the information indicating the contents of traffic control to the router in the communication path because the information will be transferred by the protocol, thereby lightening the burden of the managing person. However this technique causes new problems as follows.

In a system in which a user can specify the content of traffic control by the resource reservation protocol, it is necessary to install the program capable of performing a communication of the resource reservation protocol in all the terminals, so that a high burden may be applied to the managing person when the system is constructed.

In addition, in this system, since all the users can specify the communication band width of their own connections respectively, there is a possibility that a communication band or a processing capability of a router device is occupied by a certain connection and an opening of other connections or communication quality can not be assured.

SUMMARY OF THE INVENTION

In view of the foregoing, it is an object of the present invention to provide a router device and a network system using the same in which a management of connection of a managing person may easily be attained and a communication quality of each of the connections is assured.

It is another object of the present invention to provide a router device and a network system using the same in which there is provided means for performing a processing to be issued by a terminal device by its nature in place of the terminal device.

It is another object of the present invention to provide a router device and a network system using the same in which there is provided means for disabling from a user setting a communication band or the like and occupying a function of the router freely.

In order to attain the aforesaid objects, the present invention is operated such that in the case that the terminal device has no function of resource reservation protocol, the router may issue a control packet of the resource reservation protocol in place of the terminal device.

In addition, in the case that the terminal device has a function of resource reservation protocol, the router receives only the control packet sent from a terminal permitted in advance to avoid the problem that the terminal device may freely set a communication band or the like and a function of the router may be occupied.

More practically, the router device of the present invention is constructed such that each of a plurality of networks having either at least one communication terminal or at least one router device connected thereto is connected to each other and a connection between communication terminals to perform a communication through a plurality of said networks is managed as a connection by at least two of said router devices, said router device comprising: receiving means for receiving a packet from said plurality of networks; connection acknowledging means for acknowledging a connection to communicate with said packet in reference to the content of the packet received by said receiving means; transmission means for transferring said received packet to said network corresponding to the connection acknowledged by said connection acknowledging means; management table having information indicating the content of a traffic control performed in respect to said connection for every connection of said communication terminal connected to said network connected to said router device without passing through other router devices; connection management means for generating a control packet including information indicating said connection in the case that the packet received by said receiving means is a packet of not-opened connection and information indicating the content of traffic control registered in said management table in correspondent with said connection and transmitting the generated control packet to other router devices included in said connection from said transmission means; communication control means for opening said connection in response to both information indicating a connection used for generating said control packet and information indicating the content of the traffic control and for applying a traffic control to the packet transferred by said transmission means in respect to said connection; and registering means for revising the content of registration of said management table in response to a predetermined instruction for management.

This router device limits the content of the traffic control performed for each of the connections in accordance with the content of registration of the management table registered by a managing person for a network, for example, under application of a management instruction, resulting in that it is possible to make a proper distribution of processing capability of the router device to each of the connections and to assure a management of each of the connections of the managing person.

In addition, this router device facilitates a management of each of the connections performed by a managing person due to the fact that only the managing table is satisfactory for the registration of the connection with the communication terminal directly connected without applying any other router devices.

BRIEF DESCRIPTION OF THE DRAWINGS

The present invention will be more apparent from the following detailed description, when taken in conjunction with the accompanying drawings, in which:

FIG. 2 is a hardware configuration view of a router device;

FIG. 3 is an example of a format of a packet treated by a router device;

FIG. 4 is a connection management table;

FIG. 5 is a permit list and a mapping table to be set in a router device;

DESCRIPTION OF PREFERRED EMBODIMENTS

Figure 1:
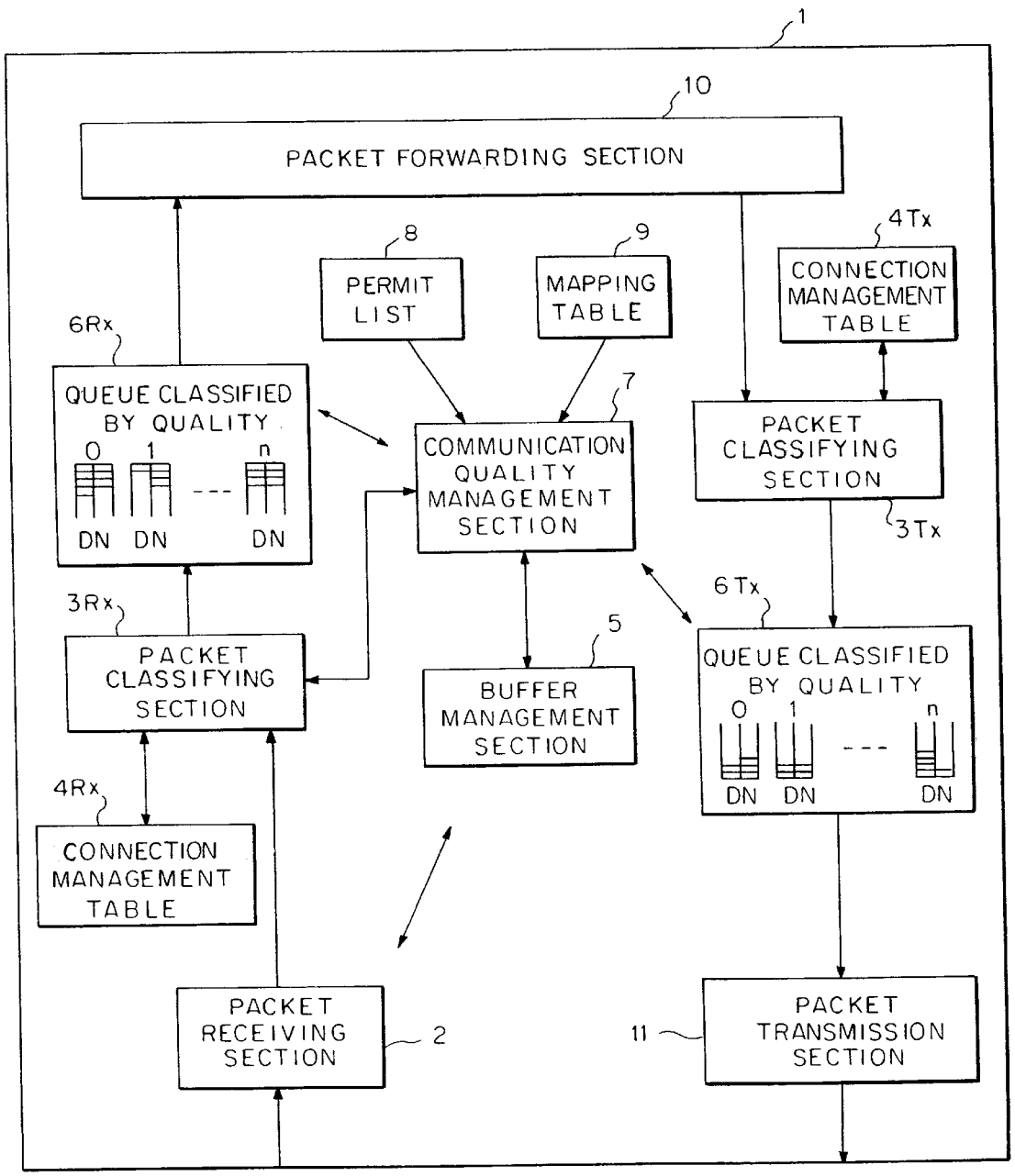
FIG. 1 is a block configuration figure for showing a router device of a first preferred embodiment of the present invention.

Referring now to the drawings, some preferred embodiments of the present invention will be described as follows.

In FIG. 1 is illustrated a function block diagram of a router device relating to a first preferred embodiment of the present invention.

Processing of the router device 1 shown in FIG. 1 are roughly classified into a packet receiving processing in which a packet is received for each of the classified quality and performing a discarding of it as required, a packet forwarding processing in which a packet to be transferred is selected corresponding to a quality class, and a packet transmission processing in which a packet selected for transferring operation is transmitted in response to a quality class. In addition, the router device 1 assures a communication quality of each of the connections by managing and restricting a transmission or a receiving and a discarding (a traffic control) of the packet corresponding to the quality class for every connection.

In FIG. 1, the router device 1 has, as a configuration related to the packet receiving processing, a packet receiving section 2 for receiving the packet and storing it in a buffer (corresponding to the buffer memory 22 in FIG. 2); a packet classifying section 3Rx for classifying a quality class of the received packet; a connection management table 4Rx used for classifying the quality class; a buffer management section 5 for managing the aforesaid buffer; and a queue 6Rx classified by quality class where the received packets are stored for each of the quality classes. In addition, as a configuration relating to the packet transmission processing, it has a packet classifying section 3Tx, a connection management table 4Tx, a queue 6Tx classified by quality and a packet transmission section 11. In addition, the router device 1 has a communication quality management section 7 for managing a packet transmission processing and a packet receiving processing, a permit list 8 and a mapping table 9 utilized in its management and a packet forwarding section 10 for performing a packet forwarding processing.

The packet transmitted to the router device 1 in the network is received at the packet receiving section 2 and stored in a vacant buffer area in the buffer. The packet classifying section 3Rx checks if the aforesaid packet connection is registered in the connection management table 4Rx and if the connection is registered, it determines a quality class of the aforesaid packet on the basis of information in the mapping table 9 and stores it in the queue 6Rx classified by quality corresponding to quality class.

In the case that the aforesaid connection is not yet registered in the connection management table 4Rx, the communication quality management section 7 classifies it from information in the permit list 8 whether or not the traffic control for the connection is permitted. Then, in the case that it is permitted, the communication quality parameter indicating the content of the traffic control is retrieved by the mapping table 9 to generate a control packet setting the retrieved communication quality parameter and then the parameter is transmitted to the network through the packet transmission section 11. The packet forwarding section 10 preferentially takes out a packet from a queue having a high quality class of the queue 6Rx classified by quality, classifies an allowable forwarding/not allowable forwarding of the packet on the basis of a transmitting address of the taken-out packet and delivers the allowable forwarding packet to the packet classifying section 3Tx. The packet classifying section 3Tx checks and determines the delivered packet quality class in reference to the connection management table 4Tx and stores it the corresponding queue 6Tx classified by quality. The packet transmission section 11 preferentially takes out a packet of high quality class from the queue 6Tx classified by quality class and transmits it to the network.

In FIG. 2 is illustrated a hardware configuration of the router device 1.

In FIG. 2, the router device 1 is comprised of a CPU 20, a main memory 21, a buffer memory 22, a network controller 23 and an internal bus 24 for use in connecting each of the sections 20 to 23. There is provided one network controller 23 for every network connecting to the router device 1. The packet receiving section 2 and the packet transmission section 11 shown in FIG. 1 are realized by the processing performed under a cooperation with the network controller 23 and the CPU 20.

The packet classifying sections 3Rx, 3Tx, the buffer management section 5, the communication quality management section 7 and the packet forwarding section 10 shown in FIG. 1 are realized by the CPU 20. The queues 6Rx, 6Tx classified by quality class, the connection management tables 4Rx, 4Tx, the permit list 8 and the mapping table 9 shown in FIG. 1 are realized by the buffer memory 22 and a memory location is managed by a pointer stored in the main memory 21.

In addition, the program executed by the network controller 23 and the CPU 20 is stored in the main memory 21, for example.

The program may also be retrieved from a storage medium such as floppy, ROM, etc or from a storage of a server connected to a network which is connected to the router, and stored in the main memory 21.

In FIG. 3 is illustrated a format of packet to be transmitted and received by the router device 1.

In FIG. 3, the packet 30 is comprised of the header section 31 and the data section 32. The header section 31 is comprised of a priority information 33 for indicating a priority required by the terminal of transmission device, a protocol information 34 indicating the type of packet, a transmission device address information 35 indicating the terminal of the transmission device, an addressing address information 36 indicating the terminal of the receiving device and a port No. information 37 for indicating an application of the terminal related to the communication. The data section 32 is comprised of a communication data or the like generated by the application of the terminal device.

This packet 30 is used as a control packet when a communication resource is reserved and a data packet when a data communication is carried out, respectively. The control packet is generated through processing of the resource reservation protocol and contains a reservation information packet sent from either a terminal of the transmission device or the router device 1 and a reservation request packet sent back from either the terminal of the receiver or the router device 1. At the reservation information packet, the aforesaid protocol information 34, the addressing address information 36 and the port No. information 37 are set. At the reservation request packet, the protocol information 34 of the received reservation information packet, the addressing address information 36 and the port No. information 37 are set and further at the data section 32 are set the communication quality parameters.

In addition, the router device 1 may also receive the management packet sent from the management terminal device operated by the management person of the network. The management person can revise the content of registration of the permit list 8 and the mapping table 9 of the optional router device 1 through transmission of the management packet.

The aforesaid four kinds of packets contain information for use in classifying the type of packet. In addition, since the application generated the received packets 30 is specified in reference to the port No. information 37, the terminal device of the receiver can receive and classify the packets 30 of a different plurality of applications in concurrent with each of applications. In this case, the protocol information 34, the addressing address information 36 and the port No. information 37 are called as connection information in total.

In FIG. 4 is illustrated one example of the set information of the connection management table 4. As shown in FIG. 4, the set of connection information (addressing address information, the protocol information and the port No. information) and the pointer information for the mapping table 9 are registered in the connection management table 4. The connection registered in the connection management table 4 is an opened connection and a pointer indicating the packet is stored in the queue 6 classified by quality in accordance with the content of the mapping table 9 specified in response to the corresponding pointer information.

In FIG. 5 is illustrated one example of a set information of the permit list 8 and the mapping table 9.

As shown in FIG. 5, in the permit list 8 are set in sets a transmission device address information, an addressing address information, a permit flag and a pointer information for the mapping table 9. "ON" is set at the permit flag of the connection of which traffic control is allowed and "OFF" is set at the permit flag of the connection not allowed. There is provided one permit list 8 for every network controller 23 of the router device 1 (for every receiving interface) and then the aforesaid information about either the network or the terminal connected to the network controller 23 is set in the permit list 8. To the pointer information, a plurality of identifiers (to be described later) of the mapping table 9 can be set.

Sets of the identifiers, the type of protocol, the port No. and the communication quality parameters are set in the mapping table 9. A plurality of communication quality parameters are set in correspondence with the value of priority of the packet 30. In the preferred embodiment, the priority classes of the processing are indicated by four levels (0 is a minimum and 3 is a maximum) and the discard levels are indicated by two levels ("D" shows a discard-ok and "N" shows a discard-no). One mapping table 9 is set in the router device 1 and it is commonly indicated by pointer information of a plurality of permit lists 8. In this case, the quality classes are set in four levels and the priority class in processing is used as a quality class as it is. That is, the packet having a processing priority level of 3 also shows that the quality class may become 3 and it is processed at the highest priority in the forwarding processing of the packet as well as the transmission processing of the packet.

In the example shown in FIG. 5, all the packets with <the protocol A and the port No. w> can be discarded and the processing priority is 0 in the case of 0 to 3 of the priority information and this is as low as 1 in the case of the priority information of more than 3. That is, this packet is suitable for a communication of batch type application where its re-transmission caused by discarding of the packet or the delay in transmission is allowed. The packet of <B, x> is not processed on the priority information, but always processed at the highest priority and can not be discarded. This packet is suitable for a communication of application of a basic work for performing an on-line processing. The packets of <C, y> and <C, z> are processed at the highest priority in the case that there are more than one priority information. A discarding level is set such that all the <C, z> are not allowed and <C, y> can be discarded in the case that the priority information is less than 3. That is, the packet of <C, y> is suitable for a transmission in a real time basis and a transmission of data (for example, audio sound information)

capable of permitting a certain reduction in transmission quality. The packet of <C, z> is suitable for a transmission of data (for example, a motion information) on a real time basis in which a reduction in transmission quality is more permitted.

Figure 6:
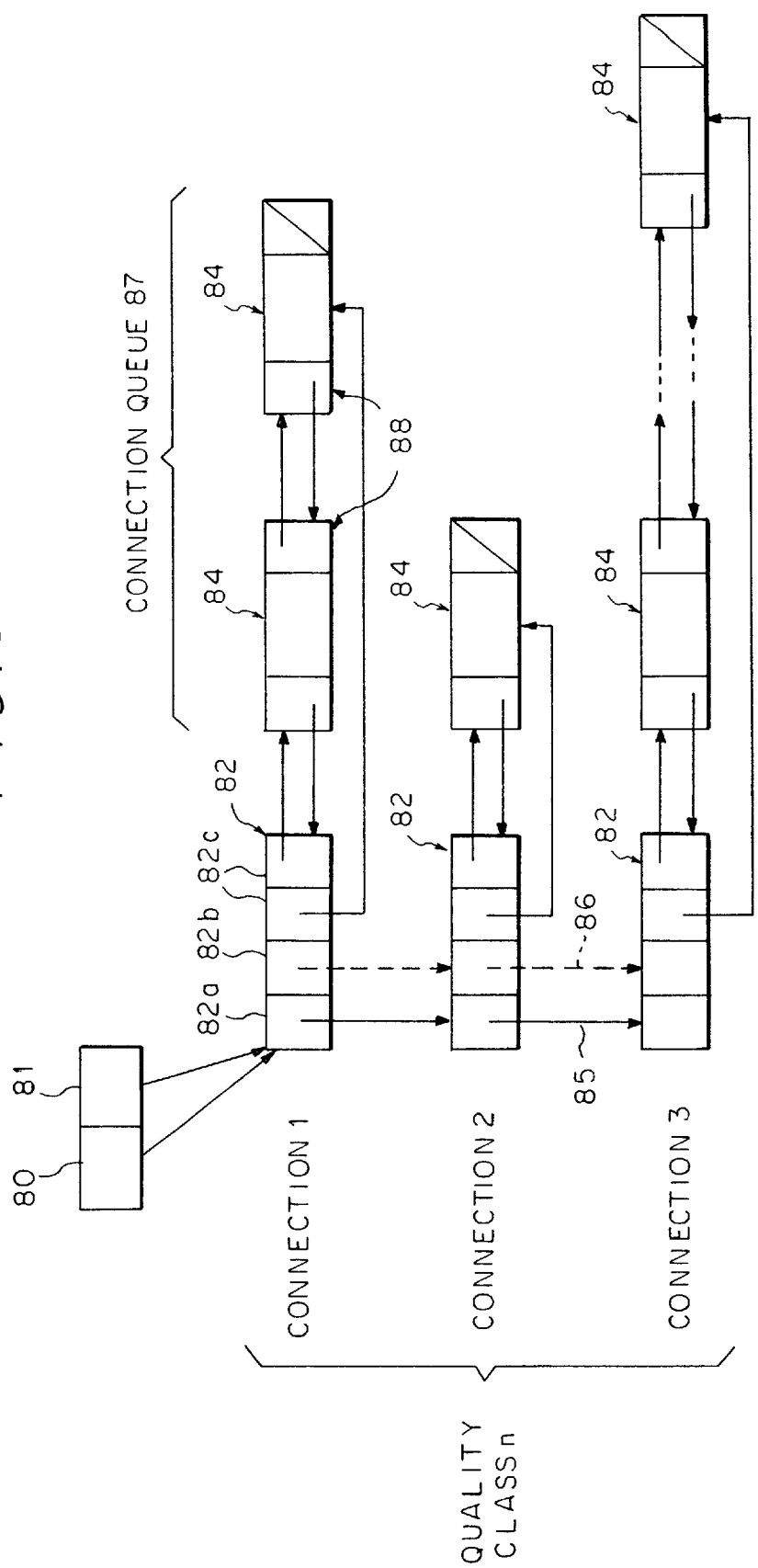
FIG. 6 is a view of configuration of a queue classified by a quality class.

In FIG. 6 is illustrated an example of configuration of each of queues 6Rx, 6Tx classified by quality.

Each of the queues 6Rx, 6Tx classified by quality contains a queue of the received packet which is classified depending on its quality class and connection. In FIG. 6 is indicated a state in which queue rows of the three connections in a certain quality class (n) are stored. Each of the quality classes has a connection pointer section 82 and a row of queue storing buffer 84 (a connection queue 87) for every connection. The connection pointer section 82 is comprised of a pointer 82a for indicating a connection pointer 82 becoming a forwarding target, a pointer 82b for indicating the connection pointer 82 becoming a discarded item next and a pointer 82c for indicating a leading queue storing buffer 84 and a last queue storing buffer 84 for its own connection.

A processing connection list 85 is formed by the pointer 82a and a discard connection list 86 is formed by the pointer 82b. Within the queue storing buffer 84 are stored the packet and the pointer 88 for indicating the queue storing buffer 84 across the packet. In this case, within the leading queue storing buffer 84 is stored the packet not yet processed and having the oldest receiving time and subsequently the packets are stored in order of newer being received to the end of the queue storing buffer 84. In addition, the connection pointer section 82 acting as the forwarding target and the discard target is pointed by each of the processing connection pointer 80 and the discard connection pointer 81, respectively.

When a connection becoming as a target to be traffic controlled is newly registered, the connection pointer 82 is added, the packet belonging to the connection is stored in the connection queue 87 of the added connection pointer 82. In the processing at each of the quality classes, the packets are processed one by one in sequence for every connection. This processing prevents only a packet of a certain specified connection from being processed in the case that many connections are present in the same quality class and enables all the connections to be equally processed. In this case, on completion of processing of the packet, the aforesaid pointer is revised and the packet is deleted from the connection queue.

A processing of the router device 1 will be described as follows in reference to the processing flow chart.

Figure 7:
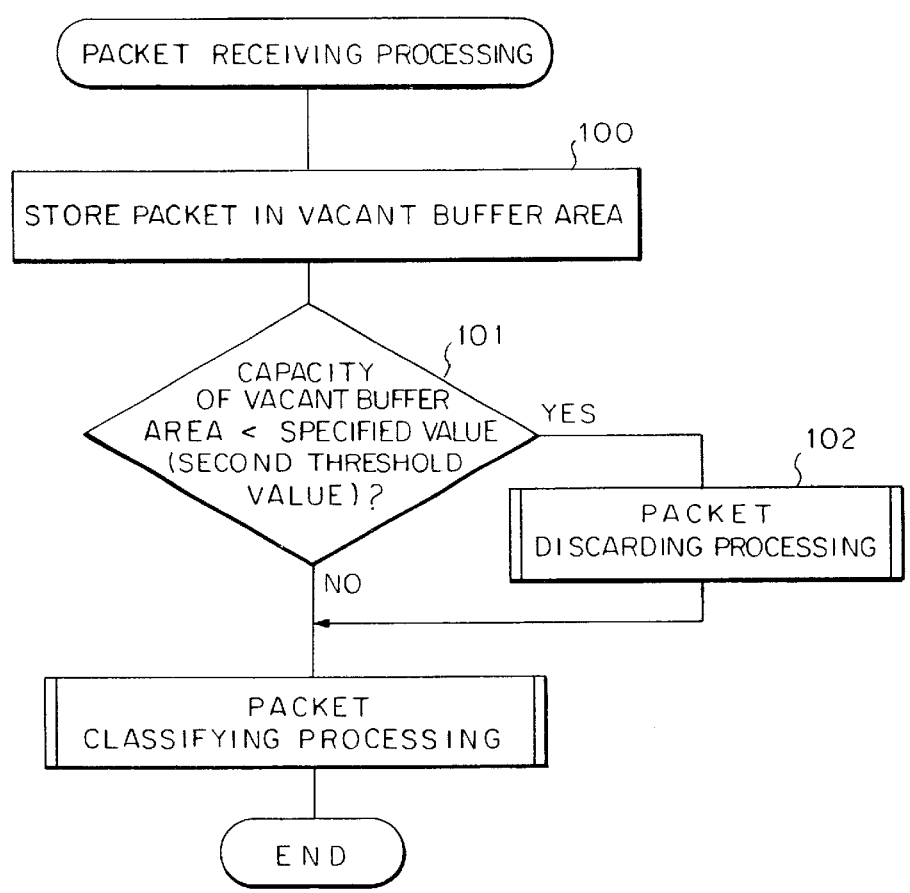
FIG. 7 is a processing flow for processing a packet receiving processing.

In FIG. 7 is indicated a processing flow of the packet receiving processing.

Upon receiving the packet, the packet receiving section 2 of the router device 1 stores the packet in the vacant buffer area of the buffer memory 22 specified by the buffer management section 5 (100). The buffer management section 11 always monitors a capacity of the vacant buffer area in the buffer memory 22 and classifies if the capacity is not less than a specified value (101). In the case that the capacity value is lower than the specified value, a packet discarding processing is carried out (102). In the case that the capacity of the vacant buffer area of the buffer memory 22 is not less than a specified value and after the processing of the step 102, the packet classifying processing (103) is carried out to complete the processing.

Figure 8:
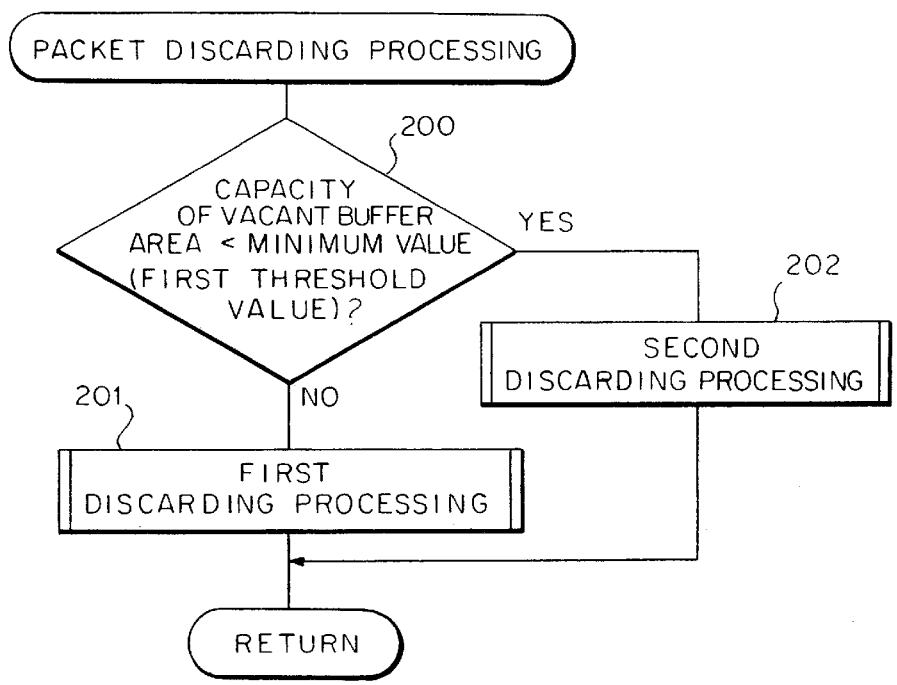
FIG. 8 is a processing flow of a packet discard processing.

In FIG. 8 is indicated a processing flow of the packet discarding processing 102. The communication quality management section 7 classifies a degree of overlapping on the basis of the vacant buffer area of the buffer memory 22 and performs any one of the two discarding controls. If the capacity of the vacant buffer area in the buffer memory 22 is not less than a predetermined minimum value (a first threshold value) (200), a first discarding control is carried out (201), and in the case that the value is lower than a predetermined minimum value, a second discarding control is carried out (202). That is, in the case that a degree of overlapping is low (i.e. there is a surplus amount in a volume of vacant buffer area in the receiving buffer), the first discarding control is carried out and in turn in the case that the degree of overlapping is high, the second discarding control is carried out.

Figure 9:
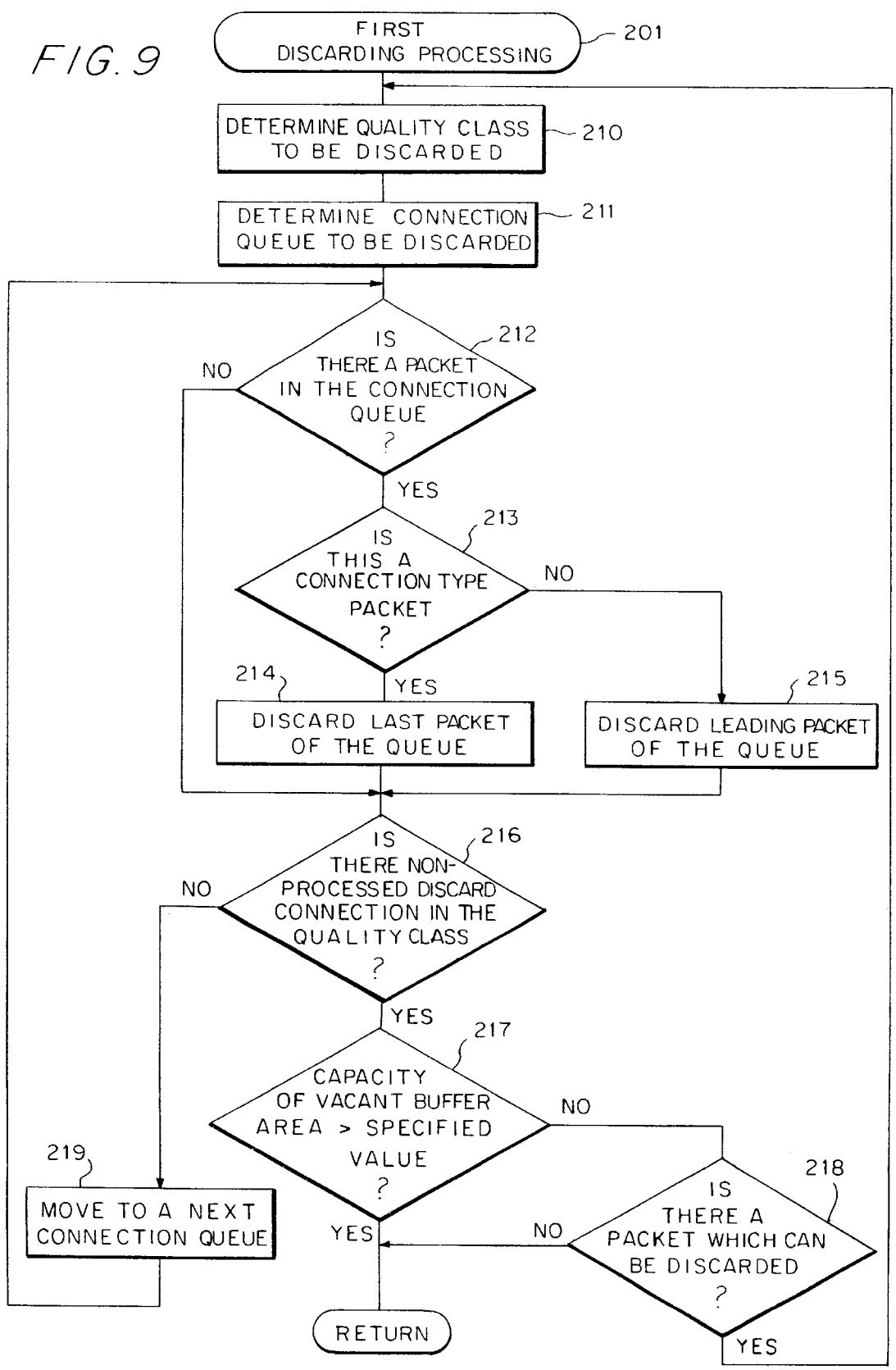
FIG. 9 is a processing flow of a first discard processing.

In FIG. 9 is shown a processing flow chart of the first discarding processing.

At the first discarding processing, the communication quality management section 7 selects the quality class having the largest total number of bytes as a target of discarding control (210). Then, the connection queue which can be discarded in the selected quality class is selected (211). As shown in FIG. 6, in the queue 6Rx classified by quality is stored the discard connection pointer 81 indicating the connection of a target to be discarded. It is checked if the packet is present in the connection queue pointed by this pointer (212) and if it is present, the packet is discarded.

In addition, in the case that the packet of the terminal for performing a re-transmission of the packet (or application) is discarded and the packet of the old receiving time stored at the extremity end of the connection queue is discarded, all the packets subsequent to the discarded packet are retransmitted and there is a possibility that the overlapping is promoted. However, in the case of the communication of the packet requiring a real time characteristic, the old packet in which the specified period of time elapsed can be eliminated, resulting in that it is preferable that the old packet is discarded as much as possible. Due to this fact, it is classified in the present processing if the packet is to be retransmitted as described above when the packet is discarded (213), the last packet of the connection queue is discarded if the packet is one to be retransmitted (214) and in turn if the packet is not retransmitted, the packet at the extremity end of the connection queue is discarded (215).

Further, since it is possible to classify it by the applied protocol if the packet is to be retransmitted, either the packet classifying processing or the quality management processing adds a flag to indicate a presence or a non-presence of retransmission to the queue pointer section 82, thereby the discrimination at the step 213 becomes possible.

In the case that the packets are discarded, the packets are discarded one by one for each of the connections of the selected quality class. When the packet of the connection indicated by the discard connection pointer 81 is discarded, a presence or a non-presence of the not-yet-processed connection is checked with a next connection queue indicated by the discard connection list 85 (216) and when the connection is present, the connection is registered in the discard connection pointer 81 and the operation returns back to the step 212. When the discarding processing for all the discard connection queues of the selected quality class is completed, a vacant capacity of the buffer memory 22 is checked (217) and if the capacity is not less than the specified value (the second threshold value), the processing is completed. If the capacity is lower than the specified value, a presence or a non-presence of the discard-ok packet is checked (218), and in turn if the packet is present, the operation returns to the step 210, the quality class having the largest total number of bytes in the registered packet is selected and the aforesaid discarding processing is repeated. At the step 218, if there is no discard-ok packet, the processing is completed.

Figure 10:
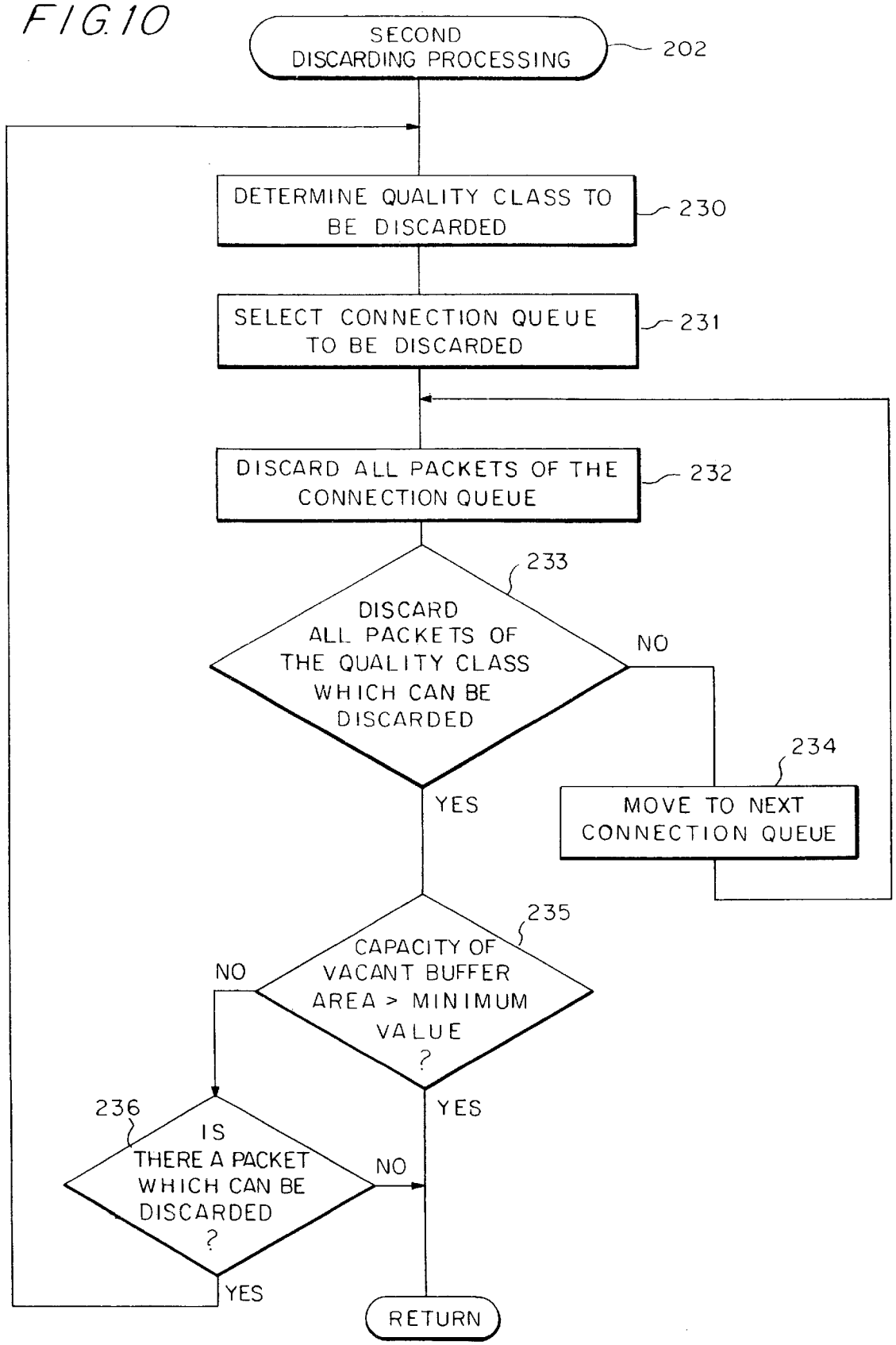
FIG. 10 is a processing flow of a second discard processing.

In FIG. 10 is indicated a processing flow chart of a second discarding processing. In this processing, the communication quality management section 7 selects the quality class accumulating the largest total number of bytes in the packet as a target for discarding control in the same manner as that of the first discarding control (230) and selects the connection queue indicated by the discarding connection pointer 81 (231). Then, all the packets registered in the selected connection queue are discarded (232). In the case that the not-yet-discarded packet is present in the quality class (233), the connection queue indicated by the discard connection list 86 is selected as a discard target (234) and then the operation returns to the step 232. When all the packets of the aforesaid quality class have been discarded (233) so as to check if a capacity of the vacant buffer area in the buffer memory 22 is not less than the minimum value (a first threshold value) 234) and if the value is not less than the minimum value, the second discarding control is completed (235). In the case that the value is lower than the minimum value, it is checked if the discard-ok packet is present in another connection (236). If the packet is present, the operation returns back to the step 230 and the discarding processing is repeated with the quality class having the largest total number of bytes being applied as discarding targets.

Figure 11:
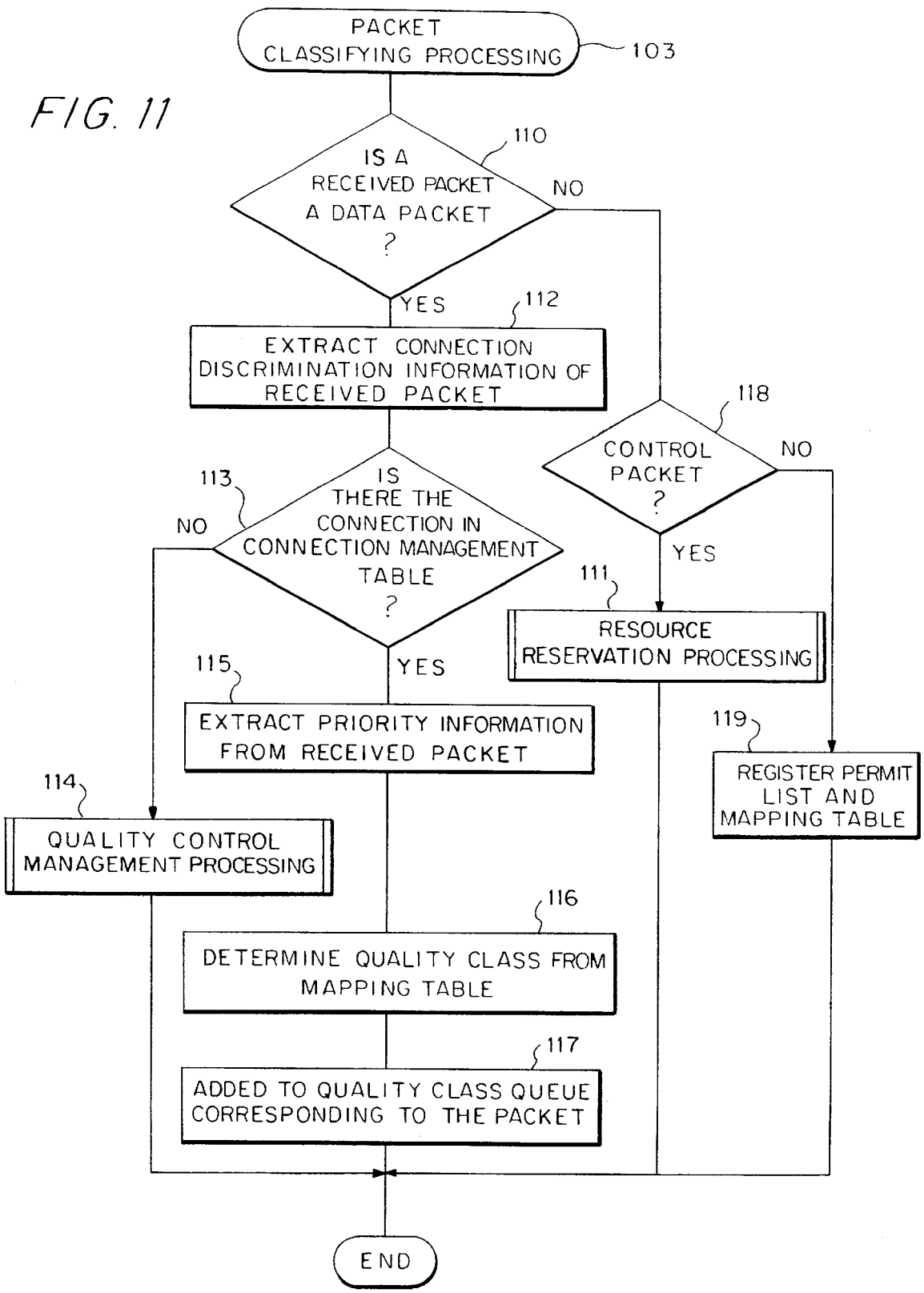
FIG. 11 is a processing flow of a packet classifying processing.

In FIG. 11 is indicated a processing flow chart of the packet classifying processing (103).

In this processing, the packet classifying section 3Rx classifies it from the protocol information 34 (110) whether or not the received packet is a data packet and in the case that the received packet is not a data packet, it classifies if the packet is a control packet or a management packet (118). In the case that the packet is the control packet, the resource reservation processing (to be described later 111) is carried out to complete the processing. In the case that the packet is the management packet for the router device 1 by itself, the registered contents in the permit list 8 and the mapping table 9 are revised in response to the set information so as to complete the processing (119). In the case that the packet is classified as the data packet at the step 110, connection information (addressing address information, protocol information and port No. information) is extracted from the packet (112) and it is checked if that information is registered in the connection management table 4Rx (113).

In the case that the packet is already registered, the priority information is extracted from the packet (115), and the quality class of the aforesaid packet corresponding to the extracted priority information in the mapping table 9 indicated by the pointer information registered in sets in the connection management table 4Rx is determined (116). Then, the aforesaid packet is stored in the queue 6Rx classified by quality for the determined quality class and the pointer indicating the storing position is registered (117) to complete the processing.

At the step 113, in the case that the packet is not registered yet in the connection management table 4Rx, the communication quality management processing (to be described later at 114) is carried out to complete the processing.

Figure 12:
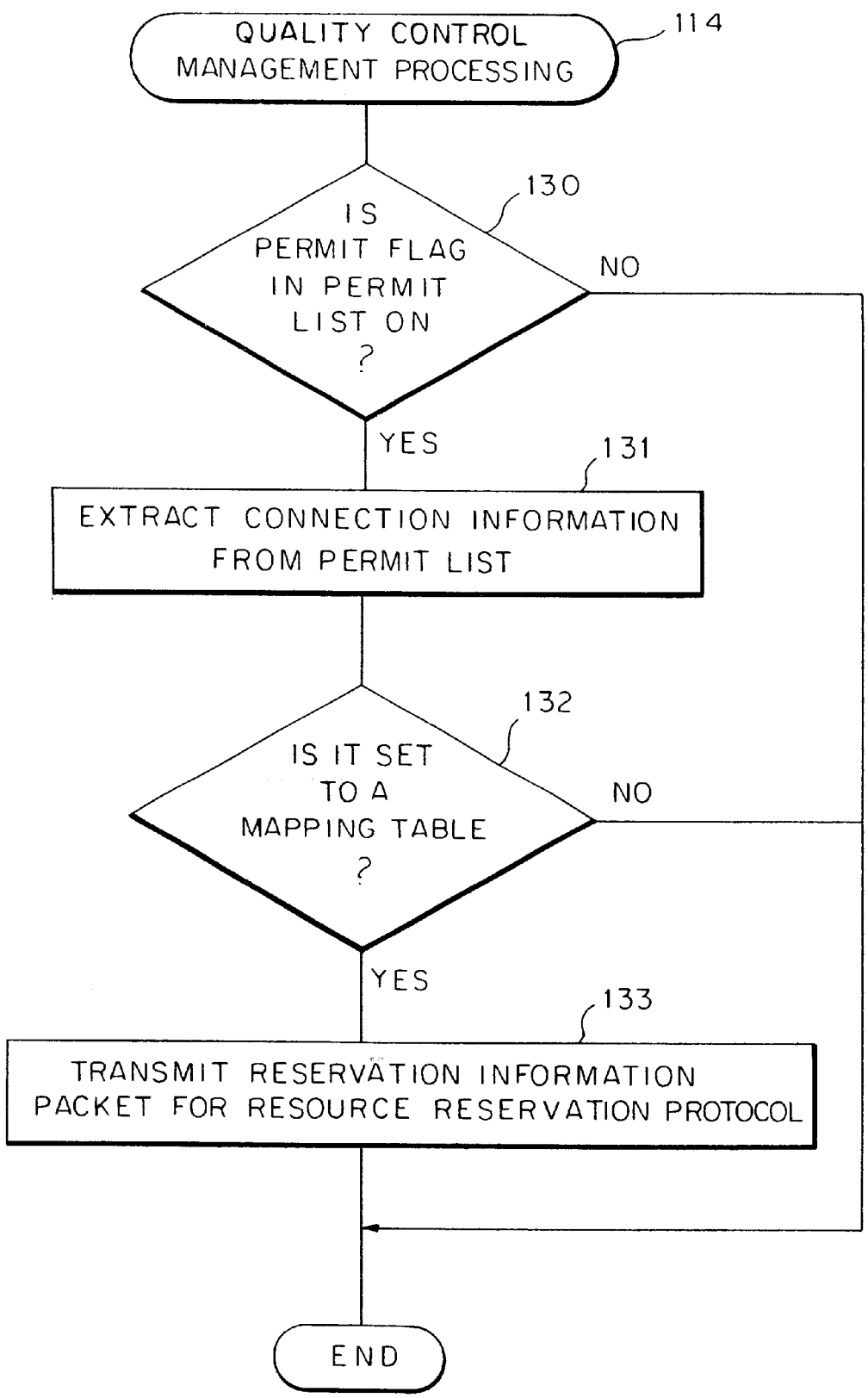
FIG. 12 is a processing flow of a quality control managing processing.

In FIG. 12 is indicated a processing flow chart of the quality control management processing (114). This processing is carried out for the data packet not registered in the connection management table 4Rx. During this processing, the communication quality management section 7 checks whether or not the received data packet is allowed for the communication quality assuring control in reference to the permit list 8 on the basis of the transmission device address information 35 and the addressing address information 36 set in the packet (130). In the case that the corresponding permit flag is set "ON", the protocol information 34 and the port No. information 37 of the packet are extracted (131), and in the case that the same information is set in the corresponding mapping table 9 (132), the reservation information packet including the connection information of that packet is transmitted to the receiver side (133). At the step 130, in the case that the permit flag is "OFF", the processing is completed.

Figure 13:
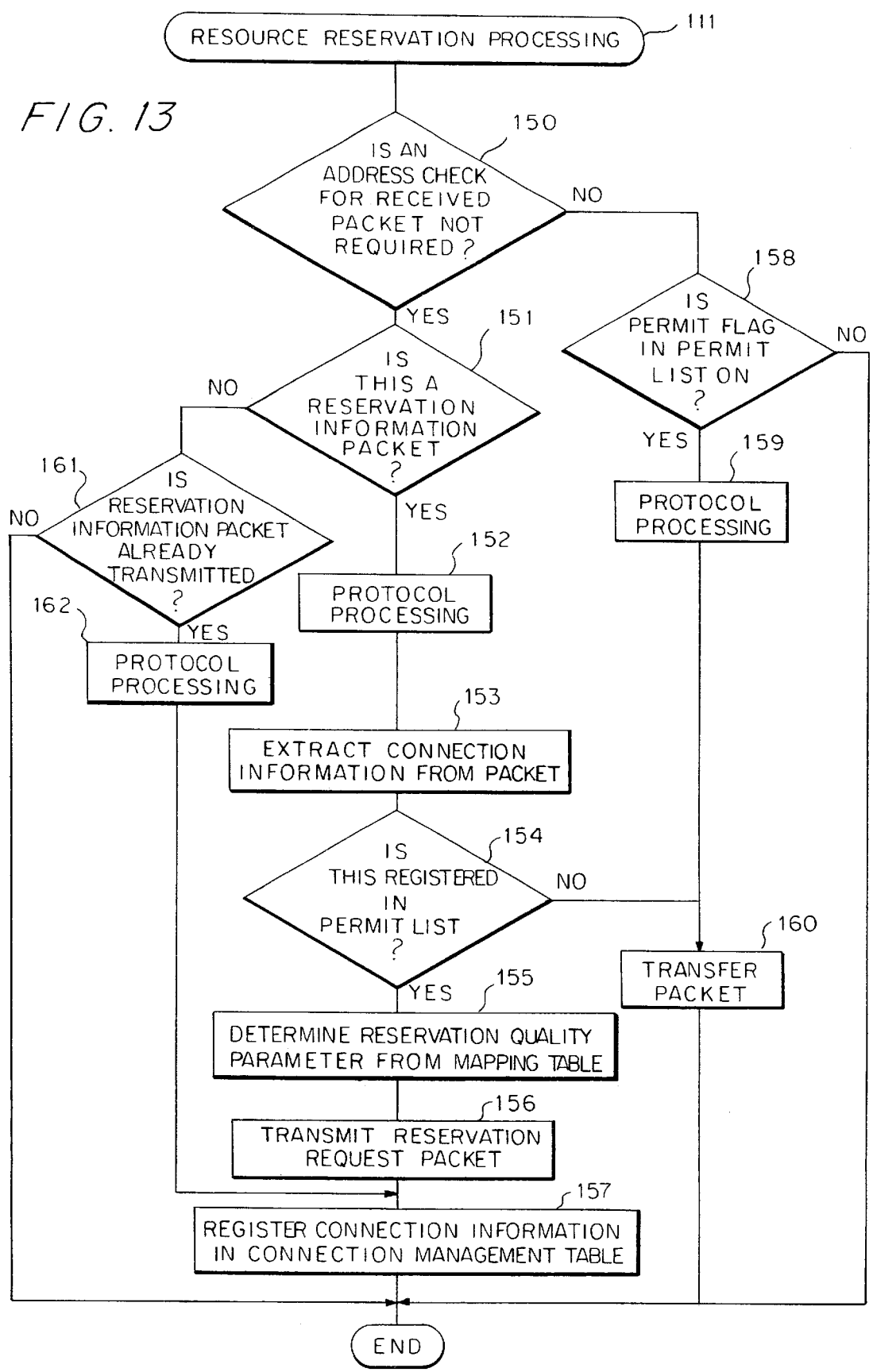
FIG. 13 is a processing flow of a resource reservation processing.

In FIG. 13 is indicated a flow chart of the resource reservation processing (111). This processing is carried out for the received control packet. At first, it is classified whether or not the received control packet is a packet issued from another router or a packet issued from a terminal device (150). This discrimination can be classified by checking the transmission device address information 35 of the control packet and by attaining whether or not the address is an address of the network directly connected to the router received the control packet. In the case that the control packet is a packet issued from another router, it is classified that the control packet is either the reservation information packet or the reservation control packet request packet in reference to the type field of the packet type contained in the packet format defined by the aforesaid resource reservation protocol (151).

If the packet is the reservation information packet, the resource reservation protocol processing is carried out (152), the connection information contained in the reservation information packet is extracted (153) and it is checked if the extracted information is registered in the permit list 8 (154). In the case that the packet is already registered, the communication quality parameter is determined by the corresponding mapping table 9 (155). Then, the reservation request packet is generated using the determined communication quality parameters and the generated reservation request packet is transmitted to the router device 1 (or a terminal) to which the reservation information packet has already been transmitted (156). Thus, information of the reservation information packet is registered in the connection management table 4 (157) in such a manner that the traffic control based on the communication quality parameter may be subsequently carried out with the communication of connection specified by the reservation information packet and the processing is completed.

In the case that the connection information is not registered in the permit list 8 at the step 154, the reservation information packet is transferred (160) and the processing is completed. In the case that the received control packet is a reservation request packet at the step 151, it is checked if the reservation information packet having the same content as that of the connection information set in the reservation request packet has been transmitted (161). In the case that the reservation information packet has already been transmitted, a protocol processing in respect to the reservation request packet is carried out (162), a registration is carried out in the management table 4 on the basis of the set information of the reservation request packet (157) and the processing is completed.

In the case that the received control packet is issued from the terminal at the step 150, the control packet transmission device address information 35 and the addressing address information 36 are extracted and it is checked if they are registered in the permit list 8 (158). If they are registered, the resource reservation protocol processing is carried out (159), the received control packet is transferred to the receiving side router device 1 (or the terminal) (160) and the processing is completed. In the case that they are not registered in the permit list 8, it is judged that the packet is of a connection not allowed for the communication quality assuring control, thereby no processing is carried out and the processing is completed.

Next, a packet forwarding processing and a packet transmission processing of the router device 1 will be described as follows.

Figure 14:
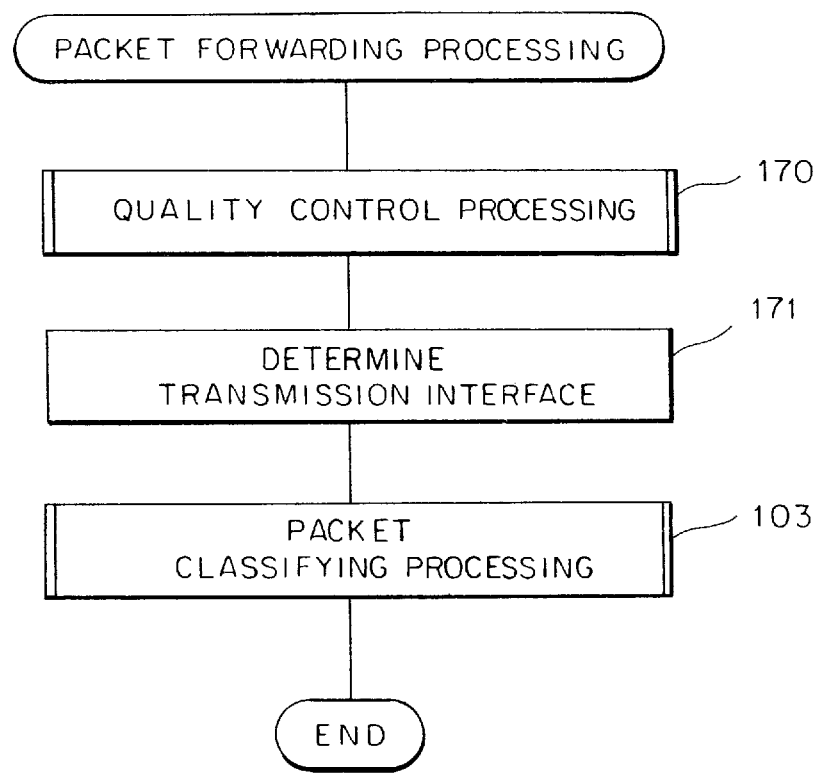
FIG. 14 is a processing flow of a packet forwarding processing.

In FIG. 14, a processing flow chart of the packet forwarding processing is shown. During this processing, the packet forwarding section 10 may select a packet to be forwarded by a quality control processing to be described later (170). It is determined which network controller is used in transmission and if a forwarding with the network controller can be performed or not in reference to the addressing address information of the selected packet (171) and the aforesaid packet classifying processing (FIG. 8) for the packet which can be forwarded is performed (103). However, during this processing, the reservation information packet and the reservation request packet are not generated and not transmitted.

Figure 15:
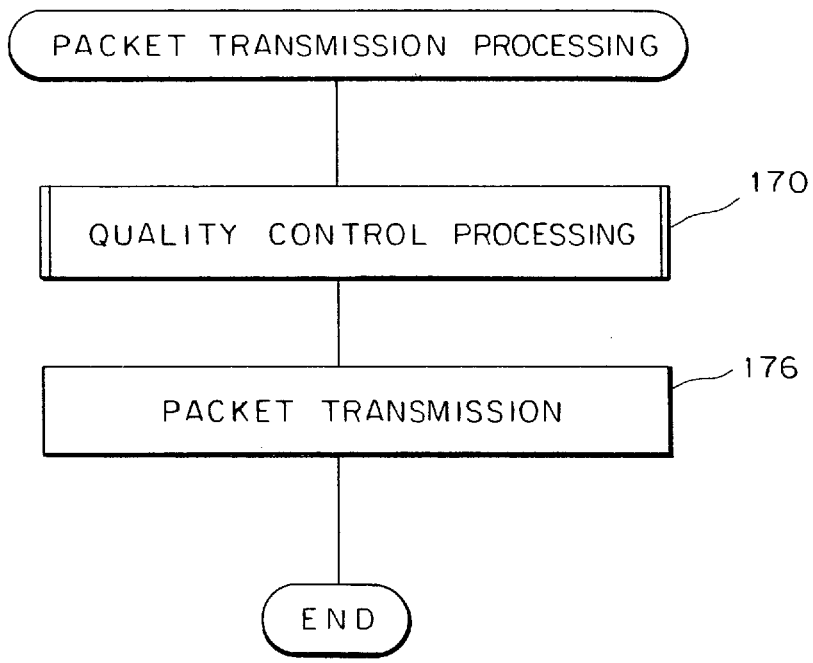
FIG. 15 is a processing flow of a packet transmission processing.

In FIG. 15 is shown a processing flow chart of the packet transmission processing. During this processing, the packet transmission section 11 selects a packet to be transmitted by the quality control processing to be described later (170) and transmits the selected packet (175).

Figure 16:
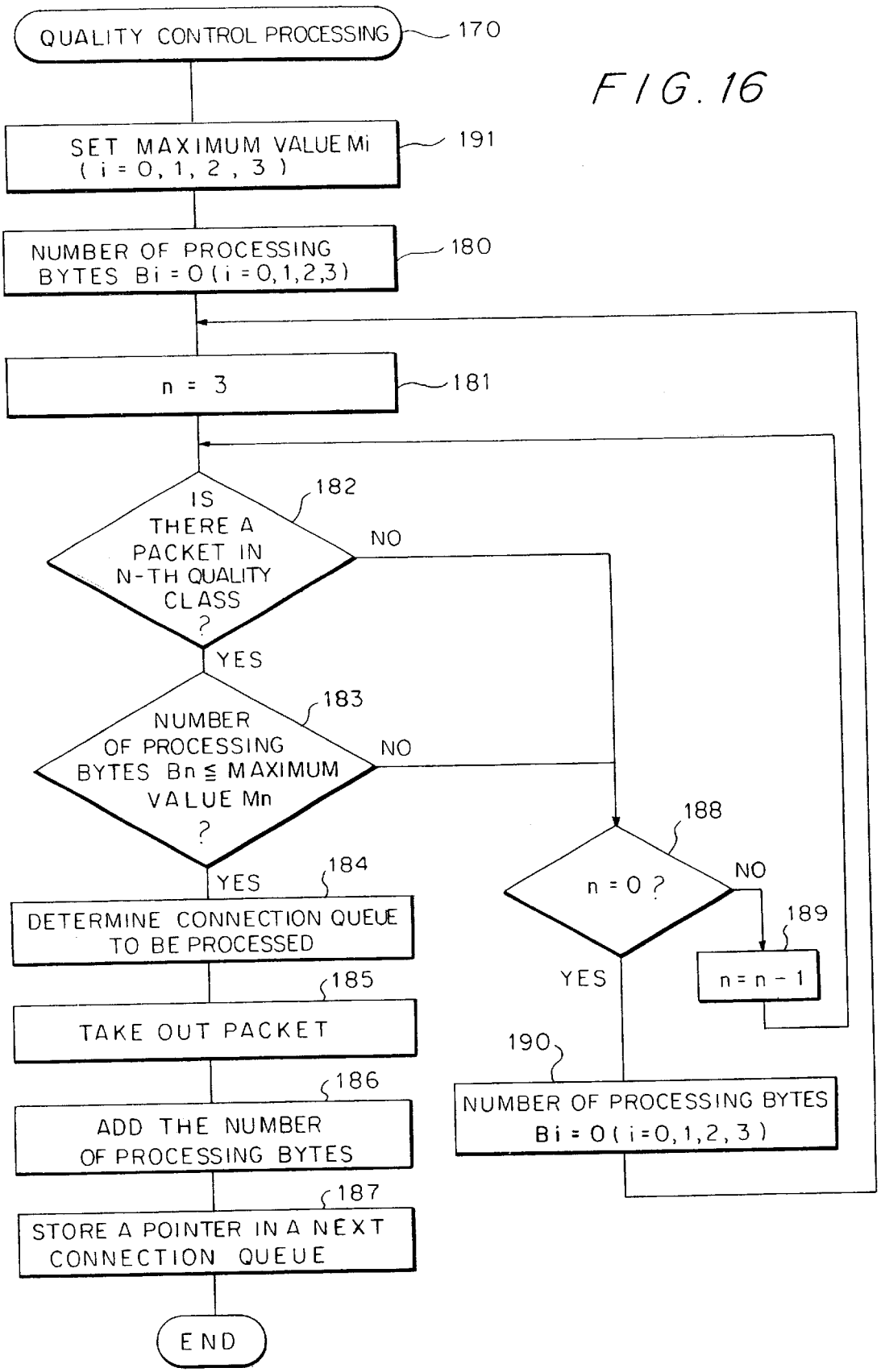
FIG. 16 is a processing flow of a quality control processing.

In FIG. 16 is shown a processing flow chart of a quality control processing (170).

During this processing, the number of bytes which can be processed continuously is restricted for each of quality classes of the queue 6 classified by quality class so as to prevent a packet having a low quality class from not being processed in the case that a large number of packets having a high quality class are received continuously. In addition, also in the case that a packet having a certain quality class is processed continuously, the packets are selected one by one for each connection so as to prevent only a packet having a certain connection from being processed.

At first, a maximum value Mi (i=0, 1, 2, 3) of the number of processing bytes for each of the quality classes is set (191). 0 is set in a counter for obtaining a total number Bi of the processed bytes for each of the quality classes (180). Numeral 3 indicating the highest quality class is set in a variable (n) indicating a quality class to be processed (181). It is checked if a packet is present in the queue of quality class of n-th order (182). If the packet is present, it is checked if the number of bytes Bn of the n-th order quality class exceeds the maximum value Mn of the corresponding quality class (183). If the value does not exceed the maximum value, a connection queue which had been registered most earlier in the n-th order quality class is determined (184). One of the packets is taken out of the determined connection queues (185) and the number of bytes of the taken-out packet is added by the counter to the number of processing bytes Bn (186). A connection list is checked and a connection queue to be processed next is stored. In the case that the number of bytes Bn exceeds the maximum value Mn at the step 183, a packet having a lower quality class than before is processed.

That is, if (n) is not 0 (188), (n) is decreased (189) and the processing is returned back to the step 182. If (n) is 0, the number of processing bytes in each of the quality classes is set to 0, and the operation is returned back to the step 181.

Although the router device 1 performs the quality control processing (170) during both packet forwarding processing and packet transmission processing, it is possible to assure communication quality also in the case that the communication quality assuring control is carried out only with the packet transmission processing. In addition, it is possible to connect more than two networks by increasing the network controller 23 and to perform a communication.

Next, the network system using the router device 1 will be described as follows.

Figure 17:
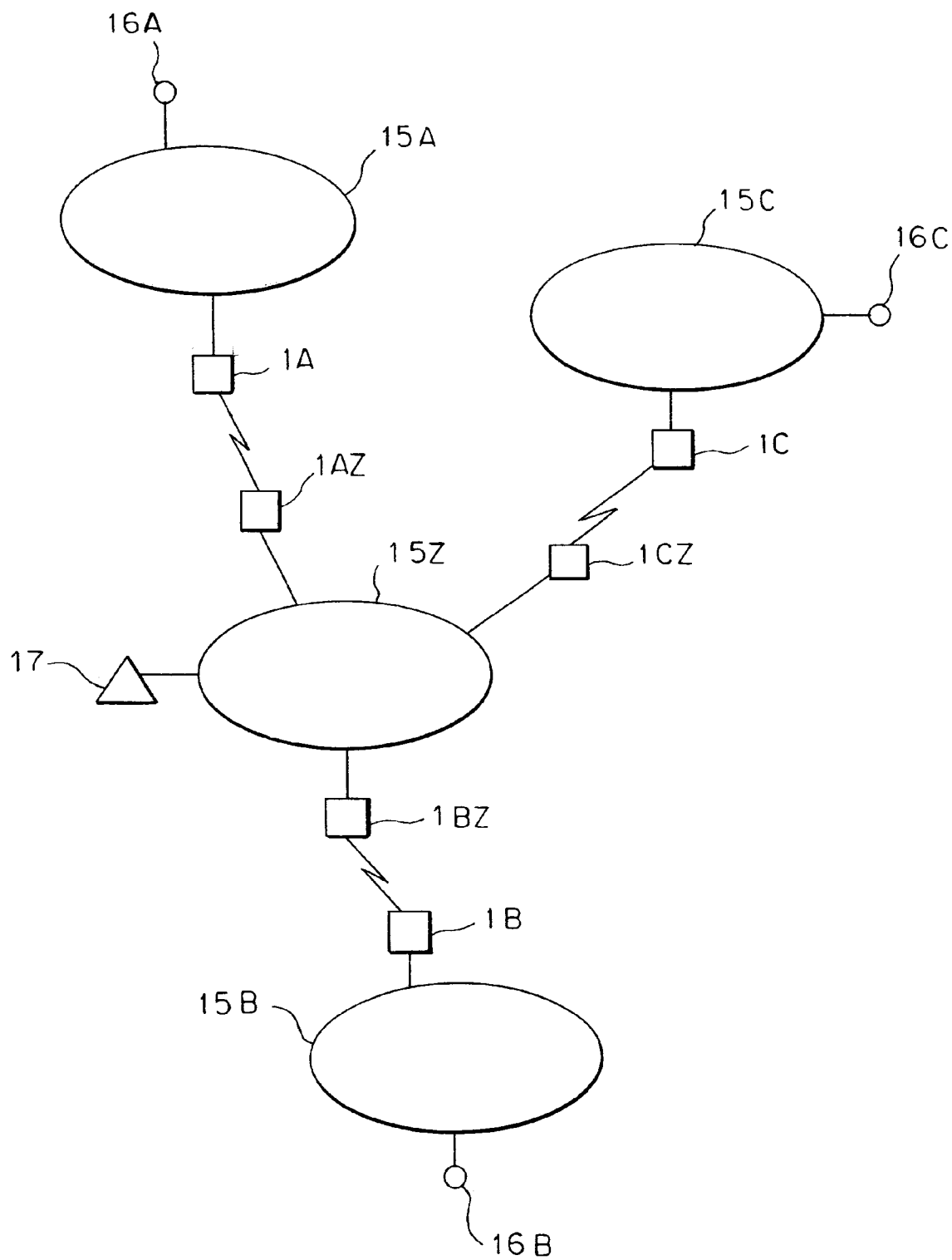
FIG. 17 is a configuration figure for showing a network system.

In FIG. 17 is illustrated an example of configuration of the network system.

The network system shown in FIG. 17 includes four networks 15A, 15B, 15C and 15Z and each of the networks 15A, 15B and 15C is connected to the network 15Z through each of the router devices 1 (1A, 1B, 1C). At least one terminal 16A, 16B and 16C connected to each network 15A, 15B and 15C respectively and further to the network 15Z is connected a network management terminal 17 for performing a circuit trouble management for the network system, router trouble management, setting of configuration definition information and collection of management information. It is defined that the network management terminal 17 can perform a setting in the permit list 8 and the mapping table 9 of the router device 1 through a management packet generated under the processing of the protocol (or the remote access) for the network management. Connection information including a transmission device address information indicating a terminal 16A of the network 15A and addressing address information indicating a terminal 16B of the network 15B is set in the permit lists 8 of the router devices 1A and 1B through this function and the corresponding permit flag is set to "ON". In addition, it is defined such that a setting of the aforesaid connection information is not set in the permit lists 8 of the router devices 1AZ and 1BZ.

When a data packet is transmitted from the terminal 16A to the terminal 16B under a state in which the connection is not registered, the router device 1A may generate a reservation information packet from the packet connection information to transmit the packet to the terminal 16B due to the fact that the permit flag of the permit list 8 corresponding to the address information of the packet is "ON". The router device 1B received this packet determines quality parameters on the basis of the set information of the reservation information packet and registers the connection in the connection management table 4 due to the fact that the address information of the received reservation information packet has already been registered in the permit list 8 of its own router device 1B. Then, the reservation request packet including the determined quality parameters and connection information is transmitted to the terminal 16A. At the router device 1A, the connection information indicated by the received reservation request packet is coincided with the connection information of the reservation information packet transmitted previously by its own router device 1A, so that the connection is registered in the connection management table 4. Other router devices 1AZ and 1BZ for forwarding these control packets have no setting of the aforesaid connection in the permit lists 8, so that all the received control packets are normally processed and transferred. With such an arrangement as above, subsequently, the traffic control corresponding to the aforesaid quality parameters is carried out for the communication between the terminal 16A and 16B.

In turn, in the case that the terminals 16A and 16B have a function for processing the resource reservation protocol, both aforesaid registration of connection and the traffic control are carried out also through transmission and receiving of the control packets of the terminals 16A and 16B. In this case, determination of the communication quality parameter is carried out by the terminal 16A or 16B and the router devices 1A and 1B perform a traffic control corresponding to the communication quality parameters.

The permit flags of the permit lists 8 of the router devices 1A and 1C for the connection across the networks 15A and 15C are set to "OFF", resulting in that a traffic control over a communication between the networks 15A and 15C is not carried out. In this case, the control packet transmitted from the terminal 16C toward the terminal 16A or 16B is discarded at the router device 1C.

As described above, the router device 1 restricts an opening of each of the connections or a content of traffic control applied to the communication of each of the connections on the basis of the content of the permit list 8 and the mapping table 9 registered by the managing person to enable the communication quality of each of the connections to be assured.

In addition, in the case that the packet of the connection not opened is transmitted, the router device 1 determines the content of the traffic control requested by the communication of the packet in reference to the content of the mapping table 9 and informs it to all the router devices included in the aforesaid connection, resulting in that it is also possible to open the connection and control the proper traffic control also for the terminal having no function of the resource reservation protocol.

Additionally, since the router device 1 requires a registration of the permit list 8 and the mapping table 9 only for the connection of terminal directly connected without other router devices, it is possible to facilitate a management of the connection of the managing person as compared with the prior art requiring a registration for all router devices contained in the connection.

Figure 18:
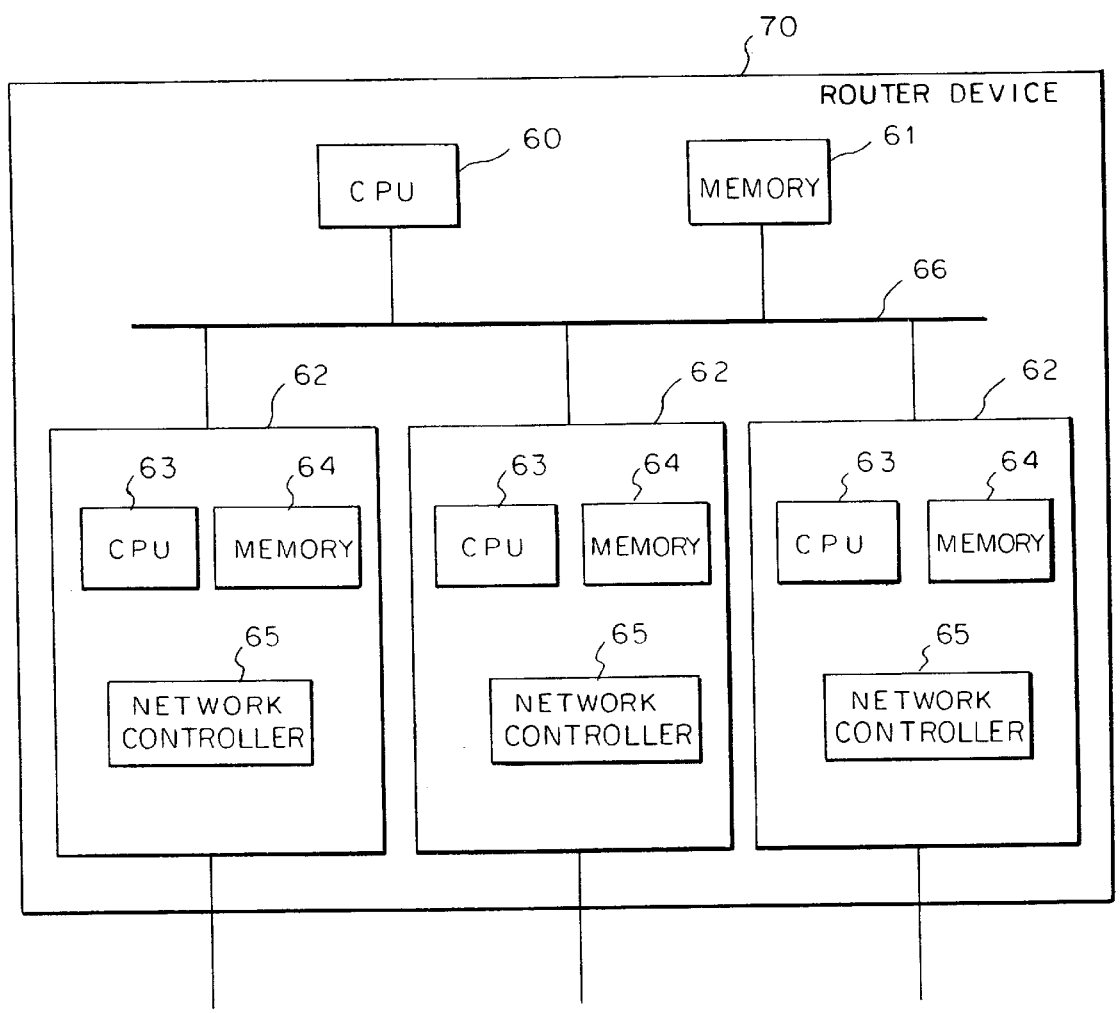
FIG. 18 is a hardware configuration of a router device relating to a second preferred embodiment.

In FIG. 18 is illustrated a hardware configuration of a router device 70 relating to a second preferred embodiment of the present invention. The router device 70 is comprised of a CPU 60 for exclusively performing a management of each of the sections of the router device 2; a memory 61 for storing a program or other management data of the CPU 60; a plurality of memory cards 62; and an internal bus 66 for use in connecting each of these sections 60 to 62. There is one memory card 62 for every network connected to the router device 70 and it contains a CPU 63, a memory 64, and a network controller 65.

The router device 70 has the same functions (refer to FIG. 1) as those of the router device 1 in the first preferred embodiment. That is, in the router device 2, the packet receiving section 2 shown in FIG. 1 is realized by the network controller 65 and the CPU 63 put in the interface card 62 receiving the packet. The packet classifying section 3Rx and the packet forwarding section 10 are realized by the CPU 63 stored in the interface card 62 received the packet. The packet classifying section 3Tx is realized by the CPU 63 stored in the interface card 62 for transmitting the packet and the packet transmission section 11 is realized by the CPU 63 and the network controller 65 stored in the interface card 62 for transmitting the packet. A queue 6Rx classified by quality class is realized by a memory 64 stored in the interface card 61 received the packet, and a queue 6Tx classified by quality class is realized by a memory 64 stored in the interface card 61 for transmitting the packet, respectively. Each of the connection management tables 4Rx and 4Tx is realized by the memory stored in each of the interface cards 62 for transmitting and receiving the packet, respectively. The communication quality management section 7 is realized by the CPU 60, and the permit list 8 and the mapping table 9 are realized by the memory 61, respectively. The mapping table 9 may also be realized by the memory 64 of each of the interface cards 62.

Next, a processing of the router device 70 will be described as follows. Each of the packet classifying processing and the quality control management processing is the same as those shown in FIGS. 11 and 12, respectively. In the resource reservation processing, the connection information in the packet for performing the traffic control is registered in the connection management information table 4 of the interface card 62 for receiving the packet during the processing shown in FIG. 13. In the packet forwarding processing as shown in the processing in FIG. 14, the interface card 62 utilized in the transmission is determined and the packet is transferred to it. The transmission and receiving processing of the packet may also similarly carried out in each of the interface cards 62 in the same manner as those shown in FIGS. 7 and 15.

According to this preferred embodiment as above, the same effect as that of the first preferred embodiment can be attained. In addition, since the transmission or receiving processing of the packet and the processing load in the forwarding processing are distributed to a plurality of CPUs 63 and 60 as well as a plurality of network controllers 65, it is possible to increase a processing capability than that of the first preferred embodiment.

According to the present invention, it is possible to provide a router device and network system using the same capable of facilitating a management of the connection of a managing person and assuring a communication quality of each of the connections.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A management method performed by a management terminal for managing networks, said networks each being connected to at least one communication terminal and being connected to each other with at least two computers for routing a packet, said management method being performed by said management terminal under processing of a protocol for managing networks, said method comprising the steps of:

generating a managing packet, said managing packet including information for a permit list in said computers and information for opening a connection for every connection of a management table in said computers;

transmitting the managing packet to said computers wherein said computers revised the content of said permit list and said management table with said information included in said managing packet before said computers generate a control packet, wherein the computer connected to the transmitting terminal generates a control packet to request traffic control in response to receiving a data packet of a not-opened connection who's opening is allowed in said permit list and transits the packet for traffic control, and wherein the computer connected to the receiving terminal generates a second control packet for response in response to receiving the packet for requesting traffic control for a registered connection in said permit list and transmits the second control packet for response.

2. A method for managing networks, said method comprising the steps of:

generating a managing packet, said managing packet including information for a permit list in computers for routing a packet and information for opening a connection for every connection of a management table in said computers;

transmitting the managing packet to said computers wherein said computers revised the content of said permit list and said management table with said information included in said managing packet before said computers generate a control packet, wherein the computer connected to the transmitting terminal generates the control packet to request traffic control in response to receiving a data packet of a not-opened connection who's opening is allowed in said permit list and transits the packet for traffic control, and wherein the computer connected to the receiving terminal generates a second control packet for response in response to receiving the packet for requesting traffic control for a registered connection in said permit list and transmits the second control packet for response.

3. A computer program for managing networks stored on a storage medium, said program comprising the steps of:

generating a managing packet, said managing packet including information for a permit list in computers for routing a Racket and information for opening a connection for every connection of a management table in said computers;

transmitting the managing packet to said computers wherein said computers revised the content of said permit list and said management table with said information included in said managing packet before said computers generate a control packet, wherein the computer connected to the transmitting terminal generates the control packet to request traffic control in response to receiving a data packet of a not-opened connection who's opening is allowed in said permit list and transits the packet for traffic control, and wherein the computer connected to the receiving terminal generates a second control packet for response in response to receiving the packet for requesting traffic control for a registered connection in said permit list and transmits the second control packet for response.

4. A packet routing method for routing a packet by a computer in a network system, said network system having plurality of networks each being connected to at least one communication terminal and being connected to each other by said computer, said method causing said computer to perform the steps of:

receiving a packet from one of said networks;

acknowledging a connection to transmit the packet in reference to the content of the packet;

generating a control packet including information indicating the connection if the received packet is a packet of a not-opened connection and information indicating the content of traffic control registered in a management table in correspondence with said connection, said management table having information indicating the content of a traffic control performed with respect to said connection for every connection of a communication terminal connected to said network without passing through other computers for routing a packet;

transmitting the generated control packet to another computer for routing a packet included in said connection;

opening said connection in response to both information indicating a connection used for generating said control packet and information indicating the content of the traffic control;

applying the traffic control to the packet transferred with respect to said connection; and revising the content of registration of said management table in response to a predetermined instruction for management.

5. A method according to claim 4, after the acknowledging step, further causing said computer to perform the step of checking whether or not an opening of said connection is allowed in reference to a permit list indicating either an allowed opening or a not-allowed opening of said connection for every connection.

6. A method according to claim 4, after the acknowledging step, further causing said computer to perform the steps of:

acknowledging the type of said received packet; and generating said control packet using the information indicating the content of the traffic control in correspondence with the types of the connection and the acknowledged packet, said information indicating the content of the traffic control for every connection is registered in said management table for every type of said packet.

7. A packet routing method for routing a packet by a computer in a network system, said network system having plurality of networks each being connected to at least one communication terminal and being connected to each other by said computer, said method causing said computer to perform the steps of:

receiving a packet from one of said networks;

acknowledging a connection to transmit the packet in reference to the content of the packet;

generating a control packet including information indicating the connection if the received packet is a packet of a not-opened connection and information indicating the content of traffic control registered in a management table in correspondence with said connection, said management table having information indicating the content of a traffic control performed with respect to said connection for every connection of a communication terminal connected to said network without passing through other computers for routing a packet; and transmitting the generated control packet to another computer for routing a packet included in said connection;

after said acknowledging step, further causing said computer to perform the steps of:

acknowledging the type of said received packet;

generating said control packet using the information indicating the content of the traffic control in correspondence with the types of the connection and the acknowledged packet, said information indicating the content of the traffic control for every connection is registered in said management table for every type of said packet; and acknowledging the type of said received packet in response to protocol information indicating a protocol used in communication of said packet and application information indicating an application of a communication terminal for processing the content of said packet.

8. A method according to claim 7, after the step of acknowledging the type of said received packet, further causing said computer to perform the step of acknowledging the type of packet in reference to priority information included in said received packet, the priority information desired by a terminal device transmitting said packet indicates a degree of priority of the processing on said packet.

* * * * *